(12) United States Patent
Isoyama

(10) Patent No.: US 7,151,747 B2
(45) Date of Patent: Dec. 19, 2006

(54) CONTROLLING METHOD OF PRIORITY CLASS SETUP OF COMMUNICATION PACKET AND SYSTEM OF THE SAME

(75) Inventor: Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/245,333

(22) Filed: Oct. 7, 2005

(65) Prior Publication Data
US 2006/0034294 A1 Feb. 16, 2006

Related U.S. Application Data

(62) Division of application No. 09/978,553, filed on Oct. 18, 2001.

(30) Foreign Application Priority Data
Oct. 18, 2000 (JP) .............................. 2000-317269

(51) Int. Cl.
*H04L 12/28* (2006.01)
(52) U.S. Cl. .................. 370/235; 370/241.1; 370/252; 370/395.42
(58) Field of Classification Search ................ 370/229, 370/230, 235, 241, 252, 253, 236, 395.4, 370/395.41, 395.42, 395.43, 241.1
See application file for complete search history.

(56) References Cited

U.S. PATENT DOCUMENTS 6,181,680 B1 * 1/2001 Nagata et al. ............... 370/248
6,212,164 B1 * 4/2001 Murakami et al. .......... 370/230
6,661,778 B1 * 12/2003 Trofin et al. ................ 370/252
7,002,918 B1 * 2/2006 Prieto et al. ................ 370/252

FOREIGN PATENT DOCUMENTS

| JP | 64-29042 | 1/1989 |
|---|---|---|
| JP | 1-191541 | 8/1989 |
| JP | 1-225260 | 9/1989 |
| JP | 10-229405 | 8/1998 |

OTHER PUBLICATIONS

Blake et al., "An Architecture for Differentiated Services" The Internet Society (1998), Informational, RFC 2475, Dec. 1998, www.ietf.org./rfc/rfc2475.txt?number=24.

* cited by examiner

*Primary Examiner*—Ricky Q. Ngo
*Assistant Examiner*—Shick Hom
(74) *Attorney, Agent, or Firm*—Young & Thompson

(57) ABSTRACT

A sender transmits performance monitoring packets to a receiver via a network either prior to or in the midst of transmission appropriately, for monitoring communication quality (a communication delay, for example) of the network. A result of the monitoring is judged from returned performance monitoring result packets, whereby priority classes of communication packets are decided to perform subsequent transmission.

8 Claims, 6 Drawing Sheets

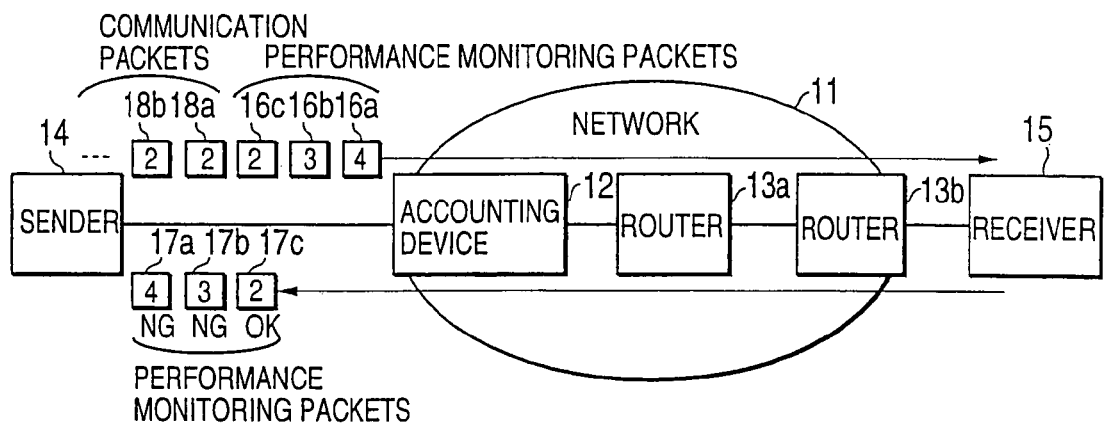
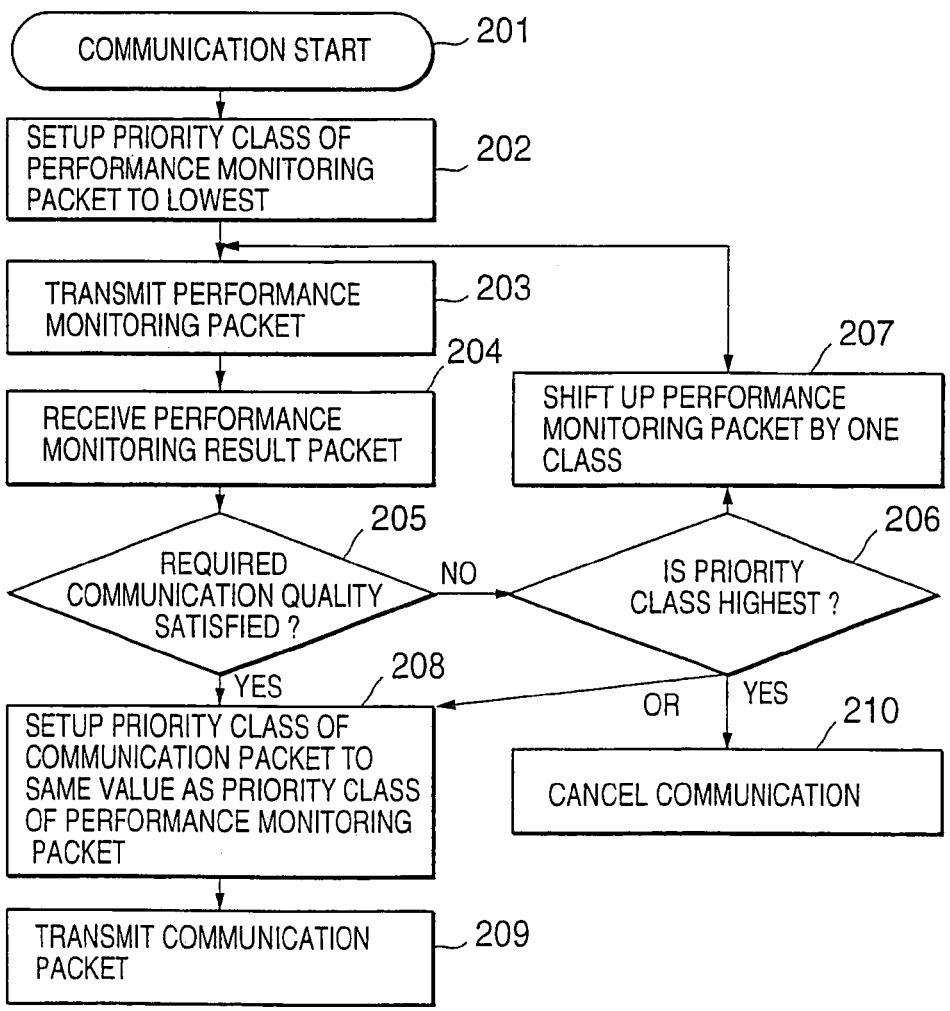

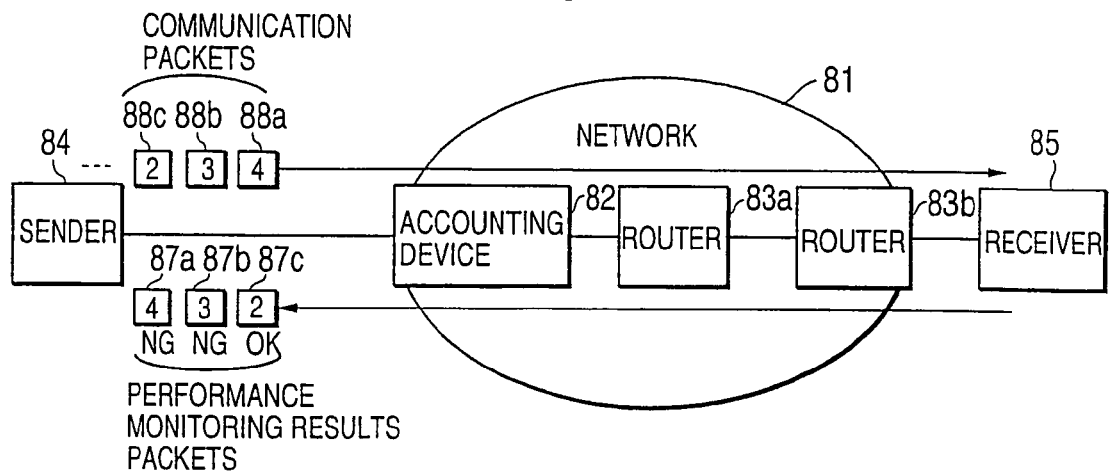
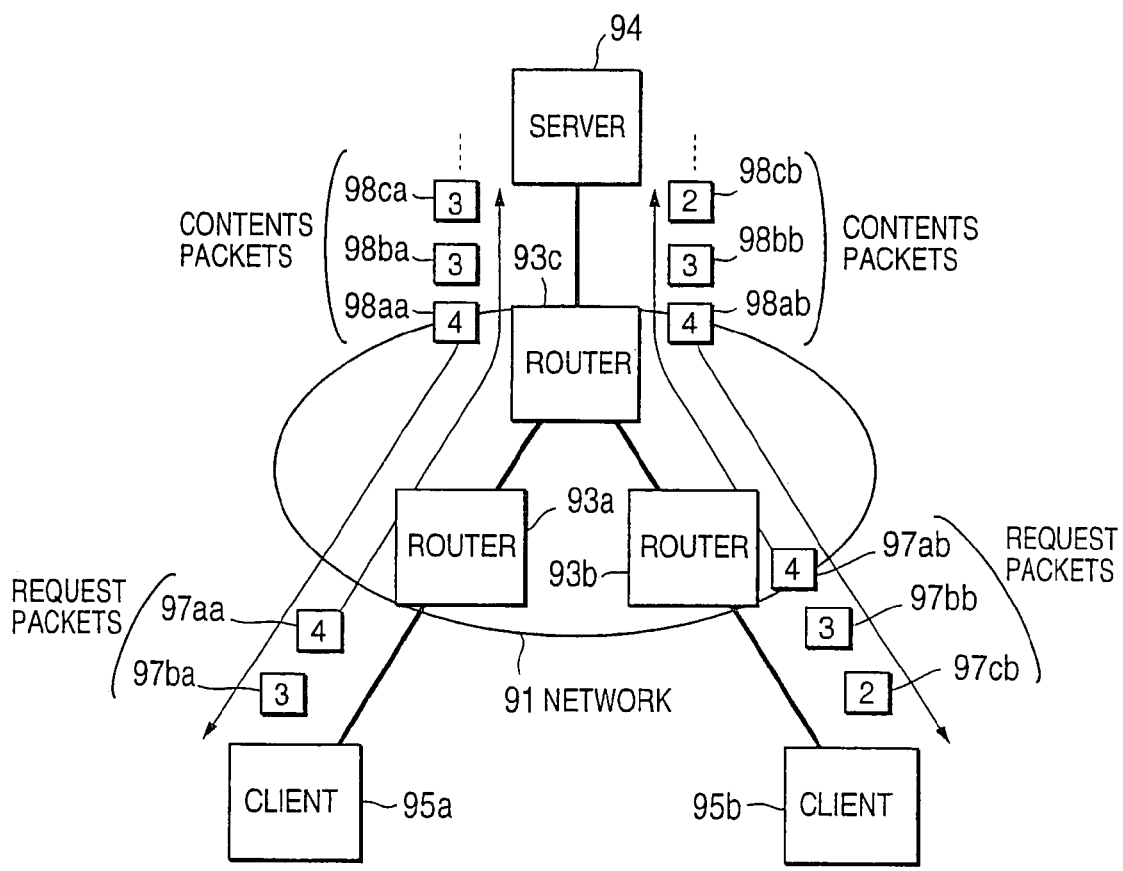

Fig.10

| APPLICATION | DELAY | DELAY VARIATION | THROUGHPUT |
|---|---|---|---|
| TELEPHONE VOICE | 100 msec or lower | 10 msec or lower | — |
| BROADCAST IMAGE | 200 msec or lower | 10 msec or lower | — |
| FTP DATA | — | — | 64 kbps or higher |

CONTROLLING METHOD OF PRIORITY CLASS SETUP OF COMMUNICATION PACKET AND SYSTEM OF THE SAME

This application is a division of co-pending application Ser. No. 09/978,553, filed on Oct. 18, 2001, the entire contents of which are hereby incorporated by reference.

BACKGROUND OF THE INVENTION

1. Field of the Invention

The present invention relates to a controlling method of priority class setup of a communication packet and a system thereof, more specifically, to a controlling method of priority class setup in a multimedia communication system in which classified communication quality is provided according to a priority class attached to a communication packet.

2. Description of Related Art

Along with the growth of the Internet in recent years, technologies for accommodating various communicative applications of different requests for communication quality (such as telephone, video and data) into one packet network have been developed. For example, Differentiated Services [IETF Request for Comments 2475] (referred to as "Diffserv") is a technology of attaching classification information to a communication packet and providing different communication quality in accordance with classes.

In a prior technology for providing classified communication quality as described above, correspondence is fixed between a communicative application and a class to be allocated. Accordingly, a user cannot alter such correspondence adaptively in accordance with a condition of communication.

Nevertheless, the communicative applications which request the same communication quality may require different classes depending on conditions (such as network congestion) or distances of communication. Accordingly, it is conceivable that optimum class allocation can be achieved by adaptively changing applied classes.

Moreover, implementation of such classified services may require an accounting system for charging different fees which vary according to types of services in each class. If the correspondence between a communicative application and a class is fixed therein, it incurs a problem of accounting practices unmatched with the requested communication quality.

It should be noted that there is also a technology of changing priorities inside a network. However, the technology does not allow a user to set up requests for communication quality at discretion.

SUMMARY OF THE INVENTION

An object of the present invention is to provide a controlling method of priority class setup of a communication packet capable of maintaining optimum communication quality by rendering communication quality of the communication packet in a communication network adaptively variable in accordance with an application in the communication packet, and to provide a system thereof.

A controlling method of priority class setup of a communication packet of the present invention includes the steps of: monitoring communication quality of a communication network prior to transmission of a communication packet by transmitting a performance monitoring packet from a sending user to a receiving user; and transmitting the communication packet after deciding a priority class of the communication packet by the sending user based on a result of the monitoring.

A controlling system of priority class setup of a communication packet of the present invention includes: means for monitoring communication quality of a communication network prior to transmission of a communication packet by transmitting a performance monitoring packet from a sending user to a receiving user; and means for transmitting the communication packet after deciding a priority class of the communication packet by the sending user based on a result of the monitoring.

BRIEF DESCRIPTION OF THE DRAWINGS

The above and other objects, features and advantages of the present invention will become more apparent from the following detailed description when taken in conjunction with the accompanying drawings wherein:

FIG. 1 is a view showing a schematic configuration of a controlling system of priority class setup of a communication packet according to a first embodiment of the present invention;

FIG. 2 is a flowchart showing operations of the first embodiment of the present invention;

FIG. 8 is a view showing a schematic configuration of a system according to a seventh embodiment of the present invention;

FIG. 9 is a view showing a schematic configuration of a system according to an eighth embodiment of the present invention; and FIG. 10 is a view showing an example of correspondence between a communicative application and requested communication quality of the present invention.

DETAILED DESCRIPTION OF THE PREFERRED EMBODIMENTS

Figure 3:
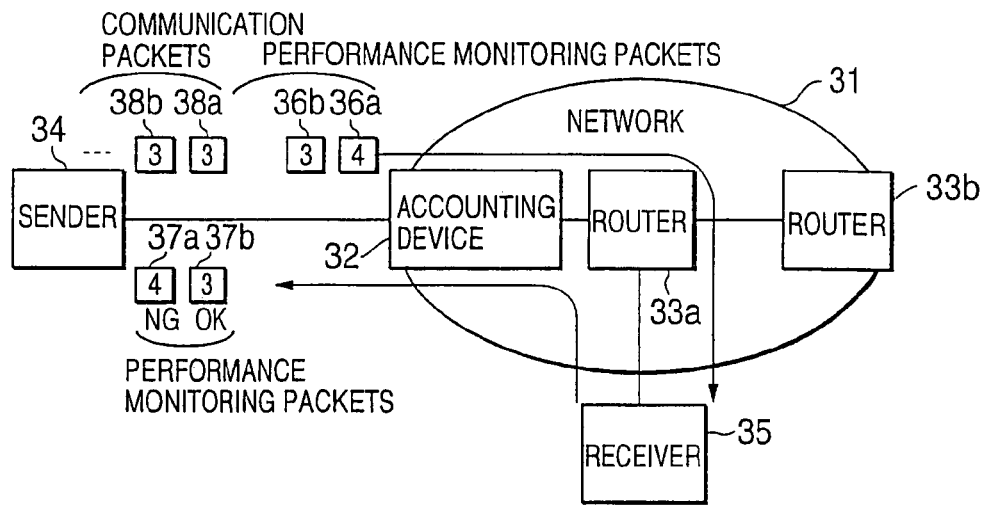
FIG. 3 is a view showing a schematic configuration of a system according to a second embodiment of the present invention.

Now, embodiments of a controlling method of priority class setup of a communication packet and a system thereof according to the present invention will be described by use of FIG. 1 to FIG. 10.

FIG. 1 is a view showing a schematic system configuration of a first embodiment of the present invention. In FIG. 1, a network 11 is a transmission network for effectuating transmission and receipt of a communication packet between a sender 14 and a receiver 15, which offers communication quality and executes accounting in accordance with priority classification based on priority class information attached to a part of a header of the communication packet.

The network 11 is constituted of an accounting device 12 which decides accounting fees by measuring amounts of communication by respective priority classes for a packet, and routers 13a and 13b for transferring the packet in accordance with priority control by the respective priority classes. The sender 14 and the receiver 15, who are users of the network 11, are connected to each other via the accounting device 12 or the routers 13a and 13b.

FIG. 2 is a flowchart for describing operations of the system configuration shown in FIG. 1. The operations of the first embodiment of the present invention will be described by use of these drawings.

When the sender 14 starts communication (Step 201), the sender 14 transmits a performance monitoring packet 16a prior to transmit communication packets 18a, 18b and so on, in order to confirm communication quality of the network 11 and to determine a priority class of the communication packets 18a and 18b. This embodiment puts the case in that the lowest priority "4" in this system is attached to the performance monitoring packet 16a (Step 202). Also in the embodiment, based on an assumption that a delay of communication (transmission) is an important factor of communication quality requested by a communicative application, the performance monitoring packet 16a possesses information regarding time of transmission in order to measure the delay of communication.

The sender 14 has standard values of requests for communication quality regarding communicative applications 101, 102, 103 and so on in each respect, as shown in FIG. 10, and every sender 14 is entitled to set such standard values severally onto the communicative applications 101, 102, 103 and so on at discretion of the sender.

The performance monitoring packet 16a is transferred to the network 11 (Step 203), it receives accounting and services as the priority class "4" in the course when it is transferred to the accounting device 12 and to the routers 13a and 13b, and then it is transferred to the receiver 15. The receiver 15 possesses a clock synchronized with a clock of the sender 14 and calculates a delay of communication by use of the time of transmission indicated in the performance monitoring packet 16a and time of receipt of the performance monitoring packet 16a. The receiver 15 further combines a result of the calculation with a performance monitoring result packet 17a, and send it back to the sender 14.

Upon receipt of the performance monitoring result packet 17a (Step 204), the sender 14 checks the result of monitoring communication quality regarding the packet of the priority class "4" as indicated in the performance monitoring result packet 17a, and confirms whether the communication quality satisfies the quality requested by the communicative application (Step 205). The standard values of the requested quality (which is a delay of communication in this embodiment) by the communicative application can be set freely by the sender 14.

If the communication quality of the priority class monitored does not satisfy the requested quality by the communicative application, the priority class is shifted up by one class to "3", to "2" and likewise, and monitoring of the communication quality is iterated by transmitting performance monitoring packets 16b and 16c. In this case, monitoring of the communication quality is iterated until the communication quality satisfies the requested communication quality, or the priority class reaches the top priority class (Steps 206, 207, 203, 204 and 205).

In the case when the performance monitoring result packet 17c is received and the communication quality of the performance monitoring packet 16c satisfies the requested communication quality by the communicative application (Step 205), transmission of the communication packets 18a, 18b and so on will be started with the applicable priority class "2" (Steps 208 and 209). Note that, in the case where the top priority class does not satisfy the requested communication quality yet at the Step 6, there are two options to be provided, namely, cancellation of communication (Step 210) or subsequent transmission of the communication packets with the top priority class (Steps 208 and 209).

As illustrated in FIG. 1, the number of routers 13a and 13b to be transmitted are increased in the case of long-distance communication, and the increase incurs deterioration of the communication quality such as delays. Accordingly, communication will be performed with a higher priority class packet as described above in order to avoid such deterioration.

FIG. 3 shows a configuration of a second embodiment. Short-distance communication is supposed in this embodiment. Accordingly, the number of transmitted routers 33a is small, whereby requested communication quality can be retained even if communication takes place using a packet with a priority class "3", which is lower than that in the first embodiment. Therefore, a sender can alter the priority class adaptively in accordance with differences in communication distance.

In FIG. 3, a reference numeral 31 denotes a network; a reference numeral 34 denotes a sender; a reference numeral 35 denotes a receiver; reference numerals 33a and 33b denote routers; a reference numeral 32 denotes an accounting device; reference numerals 36a and 36b denote performance monitoring packets; reference numerals 37a and 37b denote performance monitoring result packets; and reference numerals 38a and 38b denote communication packets, respectively.

Here, a network operating company can adjust accounting fees according to distance without consciousness of communication distance, by performing classified accounting. Moreover, since a priority class of a communication packet is decided in accordance with communication quality at the time of communication, communication may be carried out with a low priority class when a network is not congested, even if such communication is long-distance communication which requests high communication quality.

Furthermore, requested communication quality of a certain communicative application may differ depending on users in view of amounts of fees or the like. In this regard, the present invention allows an individual user to set a request for communication quality at discretion, whereby each user can perform communication with desired communication quality and undergo relevant accounting.

Figure 4:
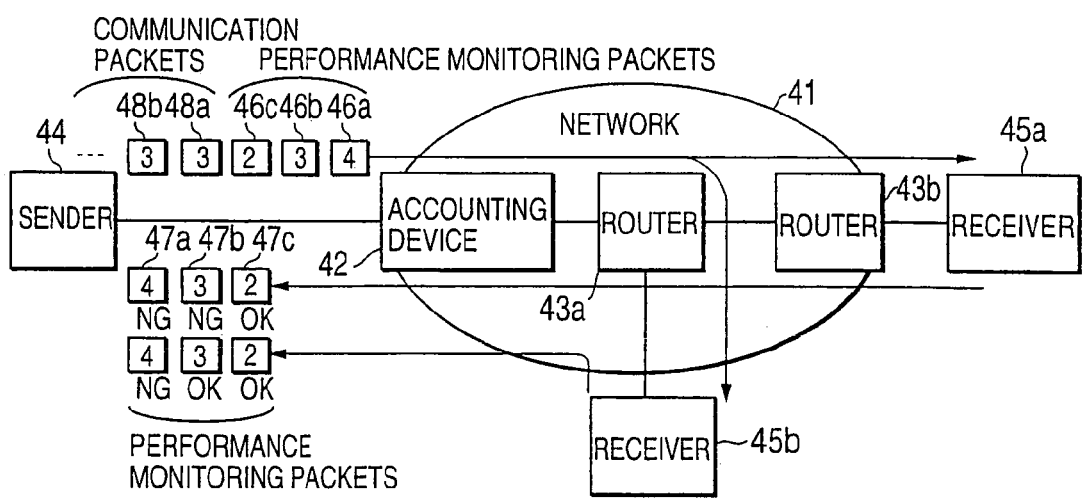
FIG. 4 is a view showing a schematic configuration of a system according to a third embodiment of the present invention.

FIG. 4 shows a configuration of a third embodiment. Multicast communication with a plurality of receivers is supposed in this embodiment. Accordingly, in the case of performing multicast communication from a sender 44 to a plurality of receivers 45a and 45b via a communication network 41, a sender 44 receives performance monitoring result packets 47aa, 47ab, 47ba, 47bb, 47ca and 47cb from both receivers 45a and 45b. Thereafter, a priority class of communication packets 48a, 48b and so on is decided in accordance with the performance monitoring result packet 47ca from the receiver 45a who requires transferring with the highest priority class "2". Accordingly, the sender can alter the priority class adaptively with respect to the plurality of multicast receivers.

In FIG. 4, a reference numeral 42 denotes an accounting device, and reference numerals 43a and 43b denote routers, respectively.

Figure 5:
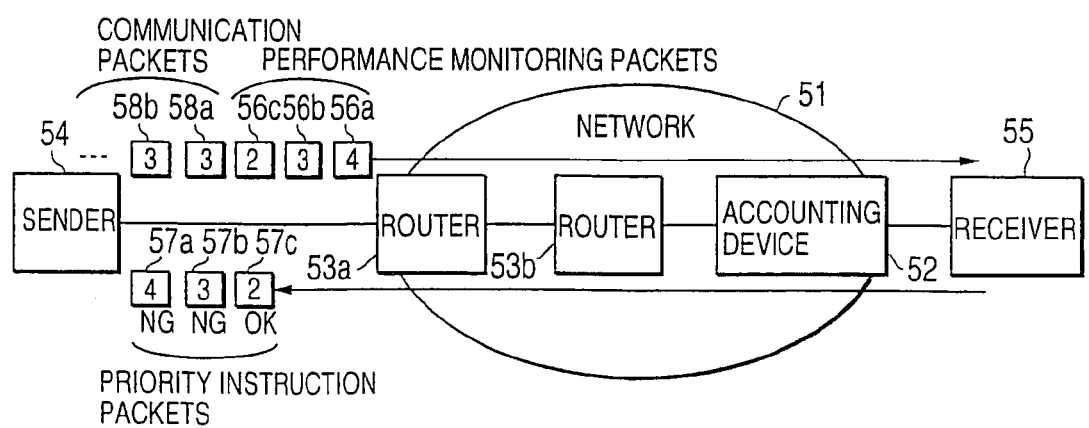
FIG. 5 is a view showing a schematic configuration of a system according to a fourth embodiment of the present invention.

FIG. 5 shows a fourth embodiment. This embodiment supposes a case in which a receiver 55 is charged fees in accordance with priority classes and amounts of receiving packets. Here, the receiver 55 has a standard value for requested communication quality by a communicative application. Accordingly, it is the receiver 55 who decides a priority class of communication packets 58*a*, 58*b* and soon, based on a monitoring result of communication quality of performance monitoring packets 56*a*, 56*b* and 56*c* transmitted by a sender 54.

Instruction of the priority class of the communication packets 58*a*, 58*b* and so on from the receiver 55 to the sender 54 is carried out by priority instruction packets 57*a*, 57*b* and 57*c*. When monitoring results of communication quality with performance monitoring packets 56*a* and 56*b* do not satisfy requested communication quality by a communicative application, the receiver requests to shift up a priority class and to resend another performance monitoring packet by use of the priority instruction packets 57*a* and 57*b*.

In the case where a monitoring result of communication quality from the performance monitoring packet 56*c* satisfies the requested communication quality by the communicative application, the receiver requests to start transmission of the communication packets with the relevant priority class by use of the priority instruction packet 57*c*. Therefore, the sender can alter the priority class adaptively in accordance with the priority instruction from the receiver.

Figure 6:
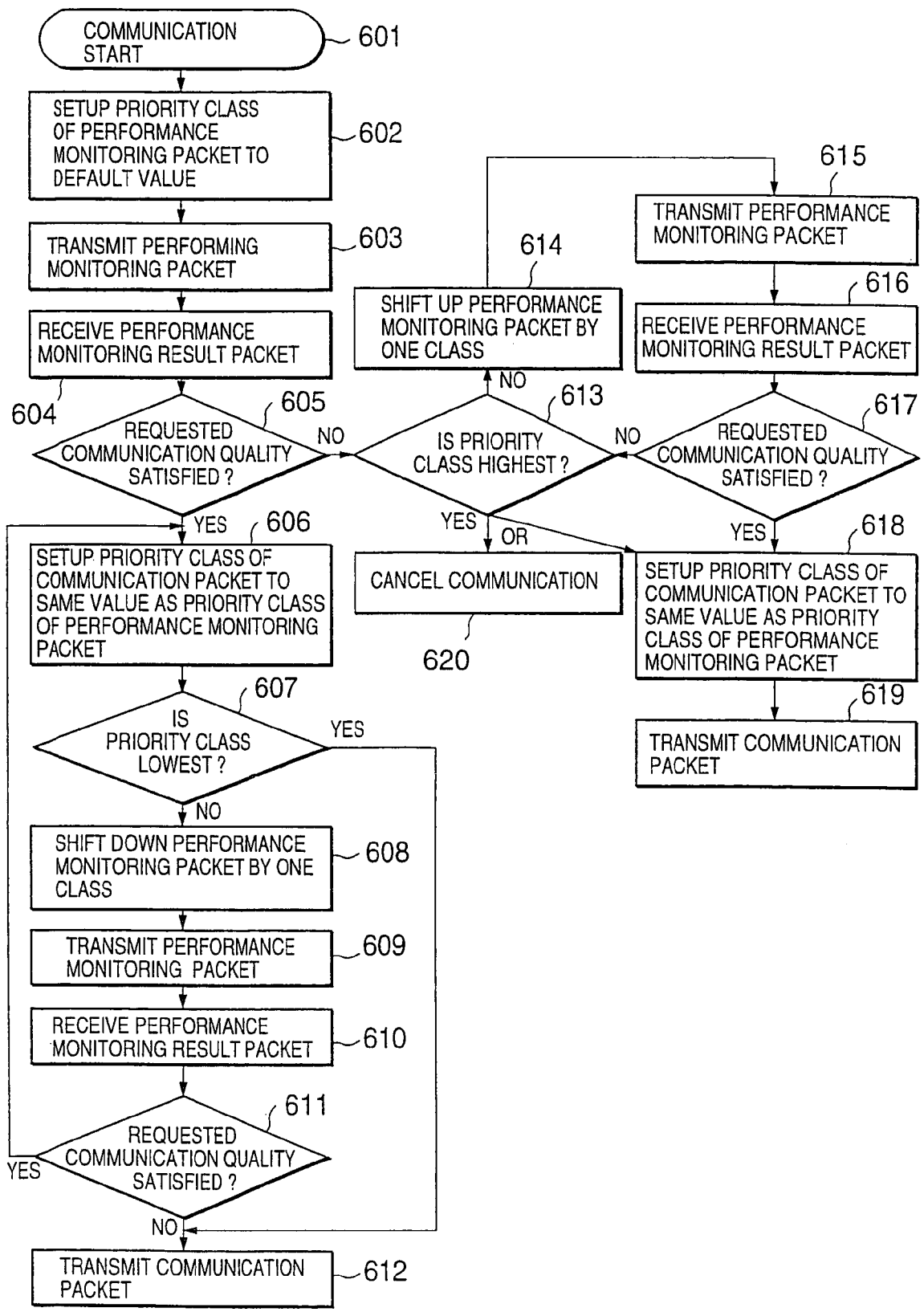
FIG. 6 is a flowchart showing operations of a fifth embodiment of the present invention.

FIG. 6 shows a flowchart of a fifth embodiment. In this embodiment, prior to transmission of communication packets, monitoring of communication quality with performance monitoring packets is started first from sending a performance monitoring packet of a priority class not of the lowest class but of a default value (a specified value, i.e. a predetermined value). Subsequently, control is performed in a manner that the priority class is shifted up when it is necessary to satisfy the requested communication quality by the communicative application and the priority class is shifted down when allowable.

With reference to FIG. 6, upon starting communication (Step 601), a priority class of a performance monitoring packet is set to a predetermined default value (Step 602), and is transmitted to a receiver (Step 603). Upon receipt of a performance monitoring result packet returned from the receiver (Step 604), judgment is made as to whether requested communication quality is satisfactory (Step 605). If satisfactory, a priority class of the communication packets is set as the same as that of the performance monitoring packet (Step 606). In this case, the communication packets are transmitted if the priority class is the lowest (Step 612). If it is not the lowest, then a priority class of the next performance monitoring packet is shifted down by one class (Step 608), and the performance monitoring packet is transmitted (Step 609).

Upon receipt of another performance monitoring result packet returned from the receiver (Step 610), judgment is made again as to whether the requested communication quality is satisfactory (Step 611). If satisfactory, Steps 606 to 611 will be iterated until the requested communication quality becomes unsatisfactory or until the priority class reaches the lowest. In this way, the priority class is decided ultimately either in one class precedent to a class by which the requested priority class becomes unsatisfactory or the lowest class of all, whereby subsequent transmission of the communication packets becomes feasible.

When the judgment turns out "NO" in Step 605, judgment is made as to whether such priority class is the highest of all (Step 613). When it is not the highest, then a priority class of the next performance monitoring packet is shifted up by one class (Step 614), and the performance monitoring packet is transmitted again (Step 615). Upon receipt of another performance monitoring result packet returned from the receiver (Step 616), judgment is made again as to whether the requested communication quality is satisfactory (Step 617). If satisfactory, the priority class of the communication packets is set as the same as that of the performance monitoring packet (Step 618), and the communication packets are transmitted (Step 619).

When the judgment turns out "NO" in Step 617, judgment is made as to whether such priority class is the highest of all (Step 613). When it is not the highest, then a priority class of the next performance monitoring packet is shifted up by one class (Step 614), and Steps 615, 616, 617 and 613 will be iterated until the requested communication quality becomes satisfactory or until the priority class reaches the highest.

It should be noted that, when the judgment turns out "YES" in Step 613, the operations would proceed either to cancellation of transmission (Step 620) or to Steps 618 and 619.

Figure 7:
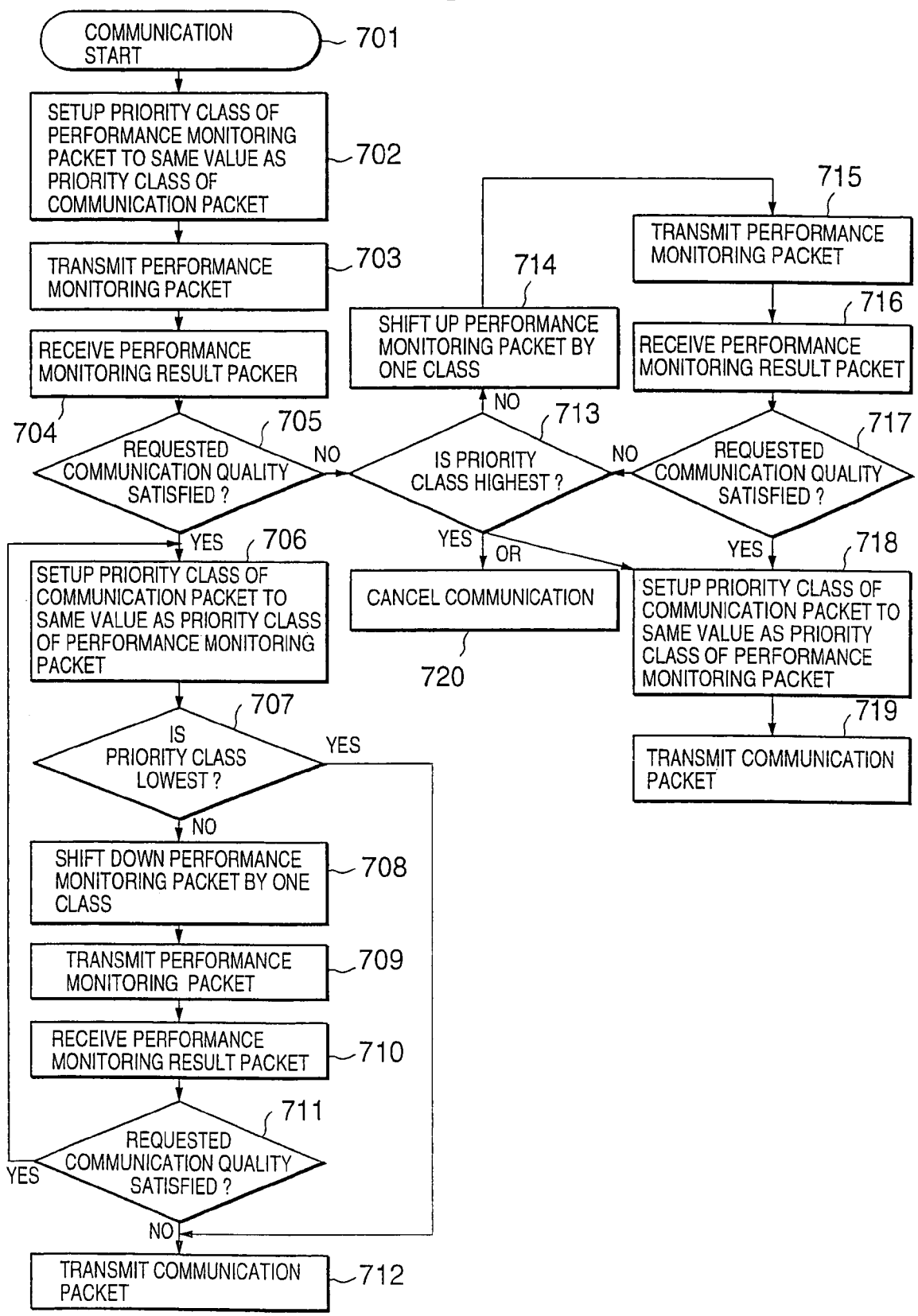
FIG. 7 is a flowchart showing operations of a sixth embodiment of the present invention.

FIG. 7 shows a flowchart of a sixth embodiment. In this embodiment, communication quality is measured during communication by transmitting performance monitoring packets appropriately. It is performance of control in a manner that a priority class of a communication packet is shifted up when it is determined that quality requested by a communicative application cannot be maintained unless the priority class of the communication packet is shifted up, and that the priority class of the communication packet is shifted down when it is determined that the quality requested by the communicative application can be maintained even if the priority class of the communication packet is shifted down. Therefore, a sender can alter a priority class adaptively to a new priority class even in the event that communication quality of a network is changed during communication.

With reference to FIG. 7, during communication (Step 701) a performance monitoring packet is transmitted. Here, transmission of the performance monitoring packets may be preset at certain intervals of time, or such transmission may be executed upon occurrence of an error in a communication packet arrived at the sender.

The performance monitoring packet sets its priority class as the same as a priority class of a communication packet in the course of communication, and the performance monitoring packet is transmitted (Steps 702 and 703). Subsequently, a performance monitoring result packet is received (Step 704), and judgment is made as to whether requested communication quality is satisfactory (Step 705).

If satisfactory, the priority class of the communication packet is set as the same as that of the performance monitoring packet (Step 706). Thereafter, judgment is made as to whether the priority class is the lowest of all (Step 707). If it is the lowest, the communication packet is transmitted (Step 712). If it is not the lowest, the priority class of the next performance monitoring packet is shifted down by one class (Step 708), and the performance monitoring packet is transmitted again (Step 709). Subsequently, the performance monitoring result packet is again received (Step 710), and judgment is made as to whether the requested communication quality is satisfactory (Step 711). Steps 710, 711, 706, 707, 708 and 709 are iterated until the requested communication quality becomes unsatisfactory or the priority class reaches the lowest class.

In this way, the priority class is decided ultimately either in one class precedent to a class by which the requested communication quality becomes unsatisfactory or the lowest class of all, whereby subsequent transmission of the communication packets becomes feasible (Step 712).

When the judgment turns out "NO" in Step 705, operating processes identical to Steps 613 to 620 in FIG. 6 are performed (Steps 713 to 720).

FIG. 8 shows a schematic system configuration of a seventh embodiment. This embodiment adopts a method in that information necessary for communication quality measurement is embedded in communication packets 88a, 88b, 88c and so on, which are supposed to be transmitted from a sender 84 to a receiver 85 via a network 81, whereby the communication quality is measured by the communication packets by themselves. In this case, performance monitoring result packets 87a, 87b and 87c returned by the receiver 85 are used respectively corresponding to priority classes, which are the information necessary for communication quality measurement embedded in the communication packets. It should be noted that a reference numeral 82 denotes an accounting device, and reference numerals 83a and 83b denote routers.

When delays are measured as the communication quality, the method of communication quality measurement may also take the form in that the receiver sends back the performance monitoring packets received from the sender by return, so that the sender is able to measure communication delays using return time of the performance monitoring packets. Apart from the communication delays, quality-of-service (QoS) parameters such as throughput, fluctuation of delays and the like may be taken as the communication quality subject to measurement in accordance with requests by communicative applications.

FIG. 9 shows an eighth embodiment. This embodiment supposes a sever/client system. A server 94 performs accounting for clients 95a and 95b severally, in accordance with elements, quantity and quality of services (contents) furnished to the clients 95a and 95b. When the clients 95a and 95b submit requests of contents by transmitting request packets 97aa and 97ab to the server 94, the request packets 97aa and 97ab include requested priority classes of content packets 98aa and 98ab.

The server 94 transmits the contents requested by the request packets 97aa and 97ab to the clients 95a and 95b, with the content packets 98aa and 98ab having the specified priority classes. In the case where the clients 95a and 95b judge upon receipt of the content packets 98aa and 98ab that service quality (responses, throughput or the like) of the received services does not meet the requested quality, the clients 95a and 95b transmit request packets 97ba, 97bb and 97cb as appropriate in which priority requests are modified in order to modify the priority classes of the content packets.

In this way, the server 94 can provide each of the clients 95a and 95b with the services in accordance with the requests, and it can perform accounting in accordance therewith. In FIG. 9, a reference numeral 91 denotes a network and reference numerals 93a to 93c denote routers.

The above-described operation flowcharts of FIG. 2, FIG. 6 and FIG. 7 are showing processes by senders in the cases of FIG. 1, FIG. 3, FIG. 4, FIG. 5 and FIG. 9. Although not specifically illustrated, each of the steps in these flowcharts is readily practicable by executing a program pre-installed in a storage medium of a computer, and it is needless to say that the function of each step is practicable by software. It is evident that the function of each step may be regarded as means, and thus it is also practicable by hardware.

The following effects are obtainable according to the present invention. Specifically, there is an effect that adaptive modification control of priority classes become feasible in accordance with communicative applications of a user in a network for providing classified communication quality based on priority class information of communication packets, by means of monitoring the communication quality of the network by transferring performance monitoring packets from a sender of the communication packets to a receiver from time to time prior to or during communication, thereby deciding priority classes of the communication packets based on results of monitoring and performing communication.

Moreover, a network operating company can conduct accounting by setting different fees depending on priorities of packets, and compiling amounts of communication (the number of communication packets, time usage and the like) of a user (a packet sender or a receiver) by the priority classes. Accordingly, as the communication takes place in longer distance, packets are more naturally transmitted by high-priority classes. Therefore, classified accounting also enables the network operating company to adjust fees in accordance with distance of communication without particular attention thereto.

Furthermore, since a priority class of a communication packet is decided in accordance with communication quality at the time of communication, long-distance communication which requires high quality can be communicated with packets of a low-priority class when the network is not congested.

While this invention has been described in connection with certain preferred embodiments, it is to be understood that the subject matter encompassed by way of this invention is not limited to those specific embodiments. On the contrary, it is intended for the subject matter of the invention to include all alternatives, modifications and equivalents as can be included within the spirit and scope of the following claims.

What is claimed is:

1. A controlling method of priority class setup in a communication system in which classified communication quality based on a priority class of a communication packet transmitted and received between a sender and a receiver via a communication network is to be provided, said controlling method of priority class setup comprising the steps of:

monitoring communication quality of said communication network by transmitting a performance monitoring packet from said sender to said receiver prior to transmission of said communication packet; and deciding a priority class of said communication packet and transmitting said communication packet by the sender based on a result of the monitoring, wherein said monitoring step includes the steps of transmitting said performance monitoring packet from said sender initially by setting up a predetermined priority class, and receiving said performance monitoring packet and returning the received performance monitoring packet to said sender as a performance monitoring result packet, and wherein said deciding step of a priority class includes the steps of:

receiving said performance monitoring result packet by said sender and judging as to whether requested communication quality by said communication packet is satisfactory;

resending said performance monitoring packet from said sender by shifting said priority class up by one class in a case where said requested communication quality is judged as unsatisfactory in said judging step;

iterating said returning step, said judging step and said resending step afterward, until any one of events that said requested communication quality becomes satisfactory and that said priority class reaches a highest priority class; and setting up said communication packet ultimately to any one of a priority class by which said requested communication quality becomes satisfactory and said highest priority class.

2. A controlling method of priority class setup in a communication system in which classified communication quality based on a priority class of a communication packet transmitted and received between a sender and a receiver via a communication network is to be provided, said controlling method of priority class setup comprising the steps of:

monitoring communication quality of said communication network by transmitting a performance monitoring packet from said sender to said receiver in the midst of communication; and deciding a priority class of said communication packet and transmitting said communication packet by the sender based on a result of the monitoring, wherein said monitoring step includes the steps of transmitting said performance monitoring packet from the sender initially by setting up a predetermined priority class, and receiving said performance monitoring packet and returning the received performance monitoring packet to said sender as a performance monitoring result packet, and wherein said deciding step of a priority class includes the steps of:

receiving said performance monitoring result packet by said sender and judging as to whether requested communication quality by said communication packet is satisfactory;

resending said performance monitoring packet from said sender by shifting said priority class up by one class in a case where said requested communication quality is judged as unsatisfactory in said judging step;

iterating said returning step, said judging step and said resending step afterward, until any one of events that said requested communication quality becomes satisfactory and that said priority class reaches a highest priority class; and setting up said communication packet ultimately to any one of a priority class by which said requested communication quality becomes satisfactory and said highest priority class.

3. The controlling method of priority class setup according to claim 1, further including the steps of:

shifting said priority class down by one class in a case where said requested communication quality is judged as satisfactory in said judging step and resending said performance monitoring packet from said sender;

iterating said returning step, said judging step and said second resending step afterward, until any one of events that said requested communication quality becomes unsatisfactory and that said priority class reaches a lowest priority class; and setting up said communication packet ultimately to any one of a priority class precedent to a class by which said requested communication quality becomes unsatisfactory and said lowest priority class.

4. The controlling method of priority class setup according to claim 2, further including the steps of:

resending said performance monitoring packet from said sender by shifting said priority class down by one class in a case where said requested communication quality is judged as satisfactory in said judging step;

iterating said returning step, said judging step and said second resending step afterward, until any one of events that said requested communication quality becomes unsatisfactory and that said priority class reaches a lowest priority class; and setting up said communication packet ultimately to any one of a priority class precedent to a class by which said requested communication quality becomes unsatisfactory and said lowest priority class.

5. A controlling system of priority class setup in a communication system in which classified communication quality based on a priority class of a communication packet being transmitted and received between a sender and a receiver via a communication network is provided, wherein said sender comprises:

a monitoring portion for monitoring communication quality of said communication network by transmitting a performance monitoring packet to said receiver prior to transmission of said communication packet; and a priority class deciding portion for deciding a priority class of said communication packet based on a monitoring result and transmitting the communication packet by said sender, wherein said monitoring portion includes a transmitting portion for transmitting by said sender said performance monitoring packet initially by setting up a predetermined priority class; and said receiver includes a returning portion for receiving said performance monitoring packet and returning the received performance monitoring packet to said sender as a performance monitoring result packet, and wherein said priority class deciding portion includes:

a judging portion for receiving said performance monitoring result packet and judging as to whether communication quality requested by said communication packet is satisfactory;

a resending portion for resending said performance monitoring packet from said sender by shifting said priority class up by one class, in a case where said requested communication quality is judged as unsatisfactory in said judging portion;

a portion for controlling operations of said returning portion, said judging portion and said resending portion to be iterated until any one of events that said requested communication quality becomes satisfactory and that said priority class reaches a highest priority class; and a portion for setting up said communication packet ultimately to any one of a priority class by which said requested communication quality becomes satisfactory and said highest priority class.

6. A controlling system of priority class setup in a communication system in which classified communication quality based on a priority class of a communication packet being transmitted and received between a sender and a receiver via a communication network is provided, wherein said sender comprises:

a monitoring portion for monitoring communication quality of said communication network by transmitting a performance monitoring packet to said receiver in the midst of transmission of said communication packet; and a priority class deciding portion for deciding a priority class of said communication packet based on a monitoring result and transmitting the communication packet, wherein said monitoring portion includes a transmitting portion for transmitting by said sender said performance monitoring packet initially by setting up a predetermined priority class; and said receiver includes a returning portion for receiving said performance monitoring packet and returning the received performance monitoring packet to said sender as a performance monitoring result packet, and wherein said priority class deciding portion includes:

a judging portion for receiving said performance monitoring result packet and judging as to whether communication quality requested by said communication packet is satisfactory;

a resending portion for resending said performance monitoring packet from said sender by shifting said priority class up by one class, in a case where said requested communication quality is judged as unsatisfactory in said judging portion;

a portion for controlling operations of said returning portion, said judging portion and said resending portion to be iterated until any one of events that said requested communication quality becomes satisfactory and that the priority class reaches a highest priority class; and a portion for setting up said communication packet ultimately to any one of a priority class by which said requested communication quality becomes satisfactory and said highest priority class.

7. The controlling system of priority class setup according to claim 5, further including:

a second resending portion for resending said performance monitoring packet from said sender by shifting said priority class down by one class in a case where said requested communication quality is judged as satisfactory in said judging portion;

a portion for controlling operations of said returning portion, said judging portion and said second resending portion to be iterated afterward until any one of events that said requested communication quality becomes unsatisfactory and that said priority class reaches a lowest priority class; and a portion for setting up said communication packet ultimately to any one of a priority class precedent to a class by which said requested communication quality becomes unsatisfactory and said lowest priority class.

8. The controlling system of priority class setup according to claim 6, further including:

a second resending portion for resending said performance monitoring packet from said sender by shifting said priority class down by one class in a case where said requested communication quality is judged as satisfactory in said judging portion;

a portion for controlling operations of said returning portion, said judging portion and said second resending portion to be iterated until any one of events that said requested communication quality becomes unsatisfactory and that said priority class reaches a lowest priority class; and a portion for setting up said communication packet ultimately to any one of a priority class precedent to a class by which said requested communication quality becomes unsatisfactory and said lowest priority class.

* * * * *